US012749007B2

(12) United States Patent
Zhang et al.

(10) Patent No.: US 12,749,007 B2
(45) Date of Patent: Sep. 29, 2026

(54) INITIALIZE OPTIMIZED PARAMETER IN DATA PROCESSING SYSTEM

(71) Applicant: International Business Machines Corporation, Armonk, NY (US)

(72) Inventors: A Peng Zhang, Xian (CN); Lei Gao, Xian (CN); Jin Wang, Xi'an (CN); Jia Xing Tang, Xian (CN); Kai Li, Xian (CN); Geng Wu Yang, Xian (CN); Zhen Liu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 1246 days.

(21) Appl. No.: 17/398,215

(22) Filed: Aug. 10, 2021

(65) Prior Publication Data

US 2023/0052848 A1 Feb. 16, 2023

(51) Int. Cl.

*G06N 20/00* (2019.01)
*G06F 8/60* (2018.01)
*G06F 11/34* (2006.01)
*G06F 11/3668* (2025.01)

(52) U.S. Cl.

CPC ............... *G06N 20/00* (2019.01); *G06F 8/60* (2013.01); *G06F 11/3452* (2013.01); *G06F 11/3684* (2013.01); *G06F 11/3688* (2013.01); *G06F 11/3692* (2013.01)

(58) Field of Classification Search

CPC .. G06N 20/00; G06N 3/0985; G06F 11/3684; G06F 11/3688; G06F 8/60; G06F 11/3452; G06F 11/3692

See application file for complete search history.

(56) References Cited

U.S. PATENT DOCUMENTS

| | | | | |
|---|---|---|---|---|
| 8,862,185 | B2 | 10/2014 | Callard | |
| 2006/0161403 | A1 * | 7/2006 | Jiang | G06N 20/00 703/2 |
| 2019/0370684 | A1 | 12/2019 | Gunes | |

(Continued)

FOREIGN PATENT DOCUMENTS

| | | | |
|---|---|---|---|
| CN | 105631518 | A | 6/2016 |
| CN | 111260074 | A | 6/2020 |
| CN | 110717535 | B | 9/2020 |

OTHER PUBLICATIONS

Feurer, nitializing Bayesian Hyperparameter Optimization via Meta-Learning (Year: 2015).*

(Continued)

*Primary Examiner* — Tewodros E Mengistu
(74) *Attorney, Agent, or Firm* — Joseph P. Curcuru

(57) ABSTRACT

An approach is provided in which the approach loads a machine learning model and a set of test case statistical data into a user system. The set of test case statistical data is based on a set of test cases corresponding to the machine learning model and includes a plurality of input parameter sets and a corresponding set of output quality measurements. The approach compares user data on the user system against the set of test case statistical data and identifies one of the plurality of input parameter sets to optimize the machine learning model based on the set of output quality measurements. The approach generates an optimized machine learning model using the machine learning model and the identified input parameter set at the user system.

20 Claims, 10 Drawing Sheets

(56) References Cited

U.S. PATENT DOCUMENTS

| | | | | |
|---|---|---|---|---|
| 2020/0050717 | A1* | 2/2020 | Kiribuchi | G06F 30/20 |
| 2020/0097847 | A1* | 3/2020 | Convertino | G06F 11/3447 |
| 2020/0167691 | A1 | 5/2020 | Golovin | |
| 2021/0027182 | A1 | 1/2021 | Harris | |
| 2021/0174210 | A1* | 6/2021 | Hsyu | G06N 3/082 |
| 2021/0303442 | A1* | 9/2021 | Chenguttuvan | G06F 11/3684 |
| 2022/0004822 | A1* | 1/2022 | Vaid | G06F 18/2113 |
| 2022/0076164 | A1* | 3/2022 | Conort | G06N 20/00 |
| 2022/0138004 | A1* | 5/2022 | Nandakumar | G06N 5/01 718/102 |
| 2023/0132064 | A1* | 4/2023 | Zhang | G06N 3/0985 706/12 |

OTHER PUBLICATIONS

Joseph, "Grid Search for model tuning," Towards Data Science, Dec. 2018, 10 pages.

Feurer et al., "Initializing Bayesian Hyperparameter Optimization via Meta-Learning," Association for the Advancement of Artificial Intelligence, 2015, 8 pages.

Luo, "PredicT-ML: a tool for automating machine learning model building with big clinical data," Health Inf Sci Syst (2016) 4:5, Jun. 2016, 16 pages.

Bergstra et al., "Random Search for Hyper-Parameter Optimization," Journal of Machine Learning Research 13, Feb. 2012, pp. 281-305.

* cited by examiner

Parameter Information 600

| ParamSetID | Key Parameters | | |
|---|---|---|---|
| | Parm1 | Parm2 | ... |
| 1 | 0.95 | 6 | ... |
| 2 | 0.85 | 3 | ... |
| 3 | 0.92 | 11 | ... |
| 4 | 0.98 | 5 | ... |
| 5 | 0.95 | 6 | ... |
| 6 | 0.95 | 7 | ... |
| ... | ... | ... | ... |

Test Data Information 650

| DataID | Test Data Info | | | | | | |
|---|---|---|---|---|---|---|---|
| | InDataSize | NFields | NContFields | NCatFields | f1 Mean | f2NCats | f2V1Perc25 |
| 1 | 100 | 120 | 20 | 100 | 9.3 | 31 | 0.46 |
| 2 | 200 | 140 | 70 | 70 | 3.3 | 19 | 0.24 |
| 3 | 500 | 430 | 50 | 134 | 11 | 27 | 0.67 |
| 4 | 220 | 120 | 30 | 40 | 22.4 | 28 | 0.34 |
| 5 | 256 | 220 | 45 | 119 | 5.6 | 31 | 0.26 |
| 6 | 500 | 120 | 70 | 88 | 8.9 | 19 | 0.26 |
| ... | ... | ... | ... | ... | ... | ... | ... |

Test Case Information 660

Descriptive Statistics 670

FIG. 6

Test Case 1
Test Data
700

| Attr1 | Attr 2 | Attr 3 | Na | K | Drug |
|---|---|---|---|---|---|
| 23 | High | High | 0.793 | 0.031 | Y |
| 47 | Low | High | 0.739 | 0.056 | C |
| 47 | Low | High | 0.697 | 0.069 | C |

Test Case 2
Test Data
720

| Attr4 | Attr 5 | Attr 5 | Salary | SalBeg | jobtm | prevexp |
|---|---|---|---|---|---|---|
| 12 | 1 | 1 | 25350 | 15000 | 82 | 32 |
| 15 | 1 | 1 | 32550 | 14250 | 96 | 43 |
| 15 | 1 | 1 | 31650 | 15750 | 92 | 64 |

740

| Test Data 1 Info | | | | | | | | | | | | |
|---|---|---|---|---|---|---|---|---|---|---|---|---|
| InDataSize | NFields | NContFields | NCatFields | f1Mn | f5Mn | f6Mn | ... | f2Cats | f3Cats | f4Cats | f7Cats | ... |
| 100 | 120 | 20 | 100 | 2.6 | 9.3 | 4.8 | ... | 31 | 0.46 | ... | ... | ... |

Test Case Information 750

Descriptive Statistics 760

770

| Test Data 2 Info | | | | | | | | | | | | | |
|---|---|---|---|---|---|---|---|---|---|---|---|---|---|
| InDataSize | NFields | NContFields | NCatFields | f1Mn | f3Mn | f4Mn | f5Mn | f6Mn | f7Mn | f8Mn | ... | f2Cats | ... |
| 200 | 140 | 70 | 70 | ... | 9.3 | 9.3 | ... | ... | ... | ... | ... | 31 | ... |

Test Case Information 780

Descriptive Statistics 790

FIG. 7

900

| DataID | Test Data Info | | | | | | | |
|---|---|---|---|---|---|---|---|---|
| | InDataSize | NFields | NCatFields | ... | UV1 | UV2 | BV1 | UV2 |
| 1 | 100 | 120 | 100 | ... | [3,5,6,2,7] | [...] | [3,9,6,3,2] | [...] |
| 2 | 256 | 300 | 208 | ... | [2,7,4,8,4] | [...] | [3,4,2,2,9] | [...] |
| 3 | 500 | 430 | 134 | ... | [6,7,2,4,8] | [...] | [6,5,1,2,7] | [...] |
| 4 | 220 | 120 | 40 | ... | [...] | [...] | [...] | [...] |
| 5 | 256 | 220 | 119 | ... | [...] | [...] | [...] | [...] |
| 6 | 500 | 120 | 88 | ... | [...] | [...] | [...] | [...] |
| ... | ... | ... | ... | ... | [...] | [...] | [...] | [...] |

Test Case Information 660

Transformed Descriptive Statistics 920

Test Case Statistical Data 350

| Test Case Statistical Data | | | | | | | | | | | | |
|---|---|---|---|---|---|---|---|---|---|---|---|---|
| DataID | Test Data Info | | | | | | | Parameters | | | Output Quality | |
| | InDataSize | NFields | NCatFields | ... | UV1 | UV2 | BV1 | Parm1 | Parm2 | ... | MSE | ... |
| 1 | 100 | 120 | 100 | ... | [3,5,6,2,7] | [...] | [3,9,6,3,2] | 0.95 | 6 | ... | 2.78 | ... |
| 2 | 256 | 300 | 208 | ... | [2,7,4,8,4] | [...] | [3,4,2,2,9] | 0.85 | 3 | ... | 4.92 | ... |
| 3 | 500 | 430 | 134 | ... | [6,7,2,4,8] | [...] | [6,5,1,2,7] | 0.92 | 11 | ... | 3.75 | ... |
| 4 | 220 | 120 | 40 | ... | [...] | [...] | [...] | 0.98 | 5 | ... | 3.64 | ... |
| 5 | 256 | 220 | 119 | ... | [...] | [...] | [...] | 0.95 | 6 | ... | 2.76 | ... |
| 6 | 500 | 120 | 88 | ... | [...] | [...] | [...] | 0.95 | 7 | ... | 3.86 | ... |
| ... | ... | ... | ... | ... | [...] | [...] | [...] | ... | ... | ... | ... | ... |

Test Case Information 660

Transformed Descriptive Statistics 920

Input Parameters 970

Output Quality Measurements 980

FIG. 9

1000

| User-Set Parameters | | | Output Quality | |
|---|---|---|---|---|
| Parm1 | Parm2 | ... | MSE | ... |
| 0.95 | 6 | ... | 0.95 | ... |

1020

| Test Data Info | | | | | | | | Parameters | | | Output Quality | |
|---|---|---|---|---|---|---|---|---|---|---|---|---|
| InDataSize | NFields | NCatFields | ... | UV1 | UV2 | BV1 | Data Sim. | Parm1 | Parm2 | ... | MSE | ... |
| 410 | 208 | 100 | ... | [3,5,6,2,7] | [...] | [3,9,6,3,2] | 0.92 | 0.95 | 6 | ... | 2.86 | ... |
| | | | | | | | | 0.85 | 3 | ... | 4.72 | ... |
| | | | | | | | | 0.92 | 11 | ... | 3.96 | ... |
| 440 | 199 | 89 | ... | [2,7,4,8,4] | [...] | [3,4,2,2,9] | 0.89 | 0.75 | 5 | ... | 6.76 | ... |
| | | | | | | | | 0.83 | 9 | ... | 4.82 | ... |
| | | | | | | | | 0.72 | 7 | ... | 5.86 | ... |
| 452 | 198 | 90 | ... | [6,7,2,4,8] | [...] | [6,5,1,2,7] | 0.86 | 0.77 | 7 | ... | 1.83 | ... |
| | | | | | | | | 0.89 | 4 | ... | 0.92 | ... |
| | | | | | | | | 0.82 | 9 | ... | 0.87 | ... |

Test Case Information 960

Transformed Descriptive Statistics 920

Data Similarity Values 1050

Input Parameters 970

Output Quality Measurements 980

1060

| Parameters | | | Output Quality | |
|---|---|---|---|---|
| Parm1 | Parm2 | ... | MSE | ... |
| 0.95 | 6 | ... | 2.86 | ... |
| 0.85 | 3 | ... | 4.72 | ... |
| 0.72 | 7 | ... | 5.86 | ... |
| ... | ... | ... | ... | ... |

FIG. 10

INITIALIZE OPTIMIZED PARAMETER IN DATA PROCESSING SYSTEM

BACKGROUND

Machine learning algorithms build machine learning models based on sample data, known as training data, to make predictions or decisions without being explicitly programmed. The process of training a machine learning model involves providing a machine learning algorithm with the training data from which to learn, and the artifact created from the training process is the machine learning model. The training data includes correct answers that are referred to as targets or target attributes, and the machine learning algorithm finds patterns in the training data that map input data attributes to the target attributes and outputs a machine learning model that captures the patterns.

A model building node in a data processing system accepts data and parameters of an algorithm as input, and then outputs a machine learning model for further use. To build a machine learning model with sufficient accuracy, users use default values for parameters or adjust values based on experience. Users then run the model building node to output the machine learning model, check the machine learning model's accuracy, and then repeat the process with adjusted parameters until the model accuracy is adequate.

BRIEF SUMMARY

According to one embodiment of the present disclosure, an approach is provided in which the approach loads a machine learning model and a set of test case statistical data into a user system. The set of test case statistical data is based on a set of test cases corresponding to the machine learning model and includes a plurality of input parameter sets and a corresponding set of output quality measurements. The approach compares user data on the user system against the set of test case statistical data and identifies one of the plurality of input parameter sets to optimize the machine learning model based on the set of output quality measurements. The approach generates an optimized machine learning model using the machine learning model and the identified input parameter set at the user system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 6 is an exemplary diagram depicting a parameter information table and test data information table utilized to build a machine learning model;

FIG. 7 is an exemplary diagram depicting data in various other tables utilized to build a machine learning model;

FIG. 9 is an exemplary diagram depicting various other tables utilized to build a machine learning model; and FIG. 10 is an exemplary diagram depicting various tables utilized to create an initially optimized machine learning model in a production environment.

DETAILED DESCRIPTION

Figure 1:
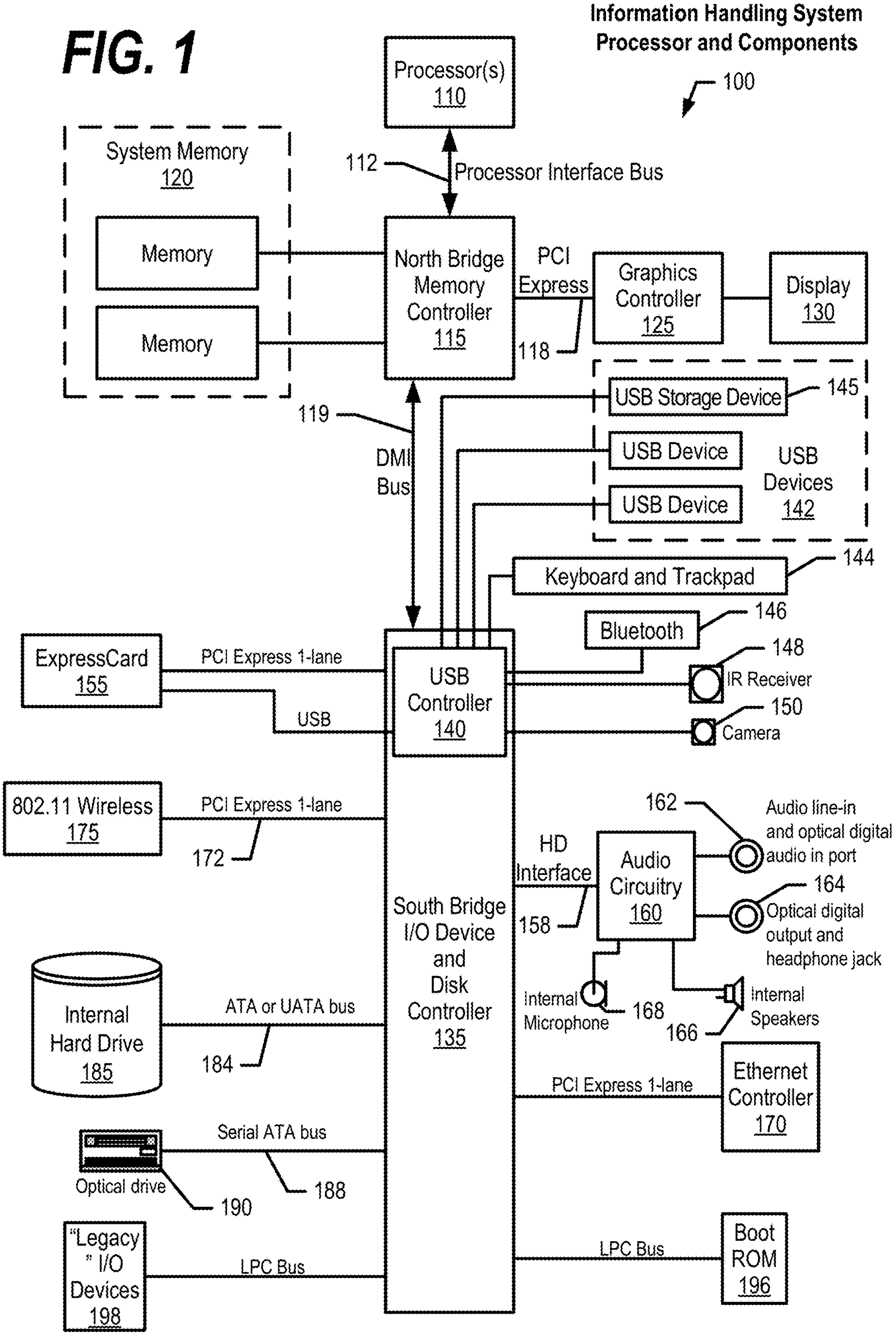
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
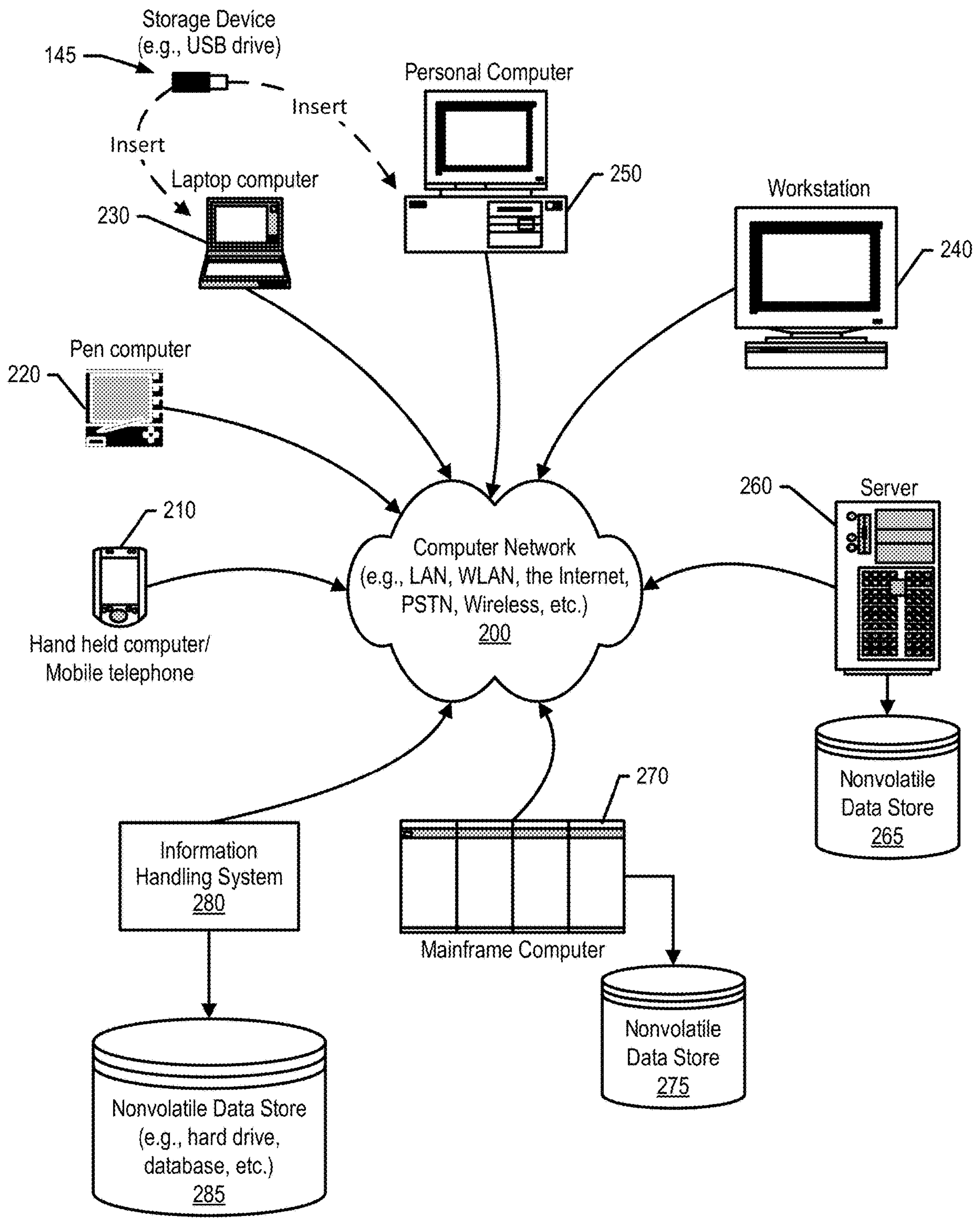
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, users iteratively adjust parameter values while building a machine learning model until the machine learning model meets accuracy requirements. A challenge found with today's approaches is that the iterations to adjust parameter values are time consuming and requires a substantial amount of computing resources in the user environment.

FIGS. 3 through 10 depict an approach that can be executed on an information handling system that deploys a pre-trained machine learning model with transformed developer data to a user environment where the pre-trained machine learning model is initially optimized based on user data. The approach builds a machine learning model to reflect a relationship between model accuracy and input information (e.g., characteristics of input data and values of parameters). The approach provides several sets of optimized parameters and model accuracy based on characteristics of input data as options for a user to select. Then, the approach predicts an accuracy of a machine learning model based on the pre-trained machine learning model, the test case statistical data, user data, and user parameter adjustments. The approach also collects information and refreshes the pre-trained machine learning model after execution of model building.

Advantages of the approach discussed herein include a) reduce time-consuming parameter value iterations and computer resources in the user environment; b) leverage machine learning model versus brute-force computation; c) development phase computation versus user side computation; d) easy to use because no domain knowledge/experience needed; e) extensible because each node has a separate machine learning model; and f) the accuracy of predictions will increase with the accumulation of the number of uses and models.

Figure 3:
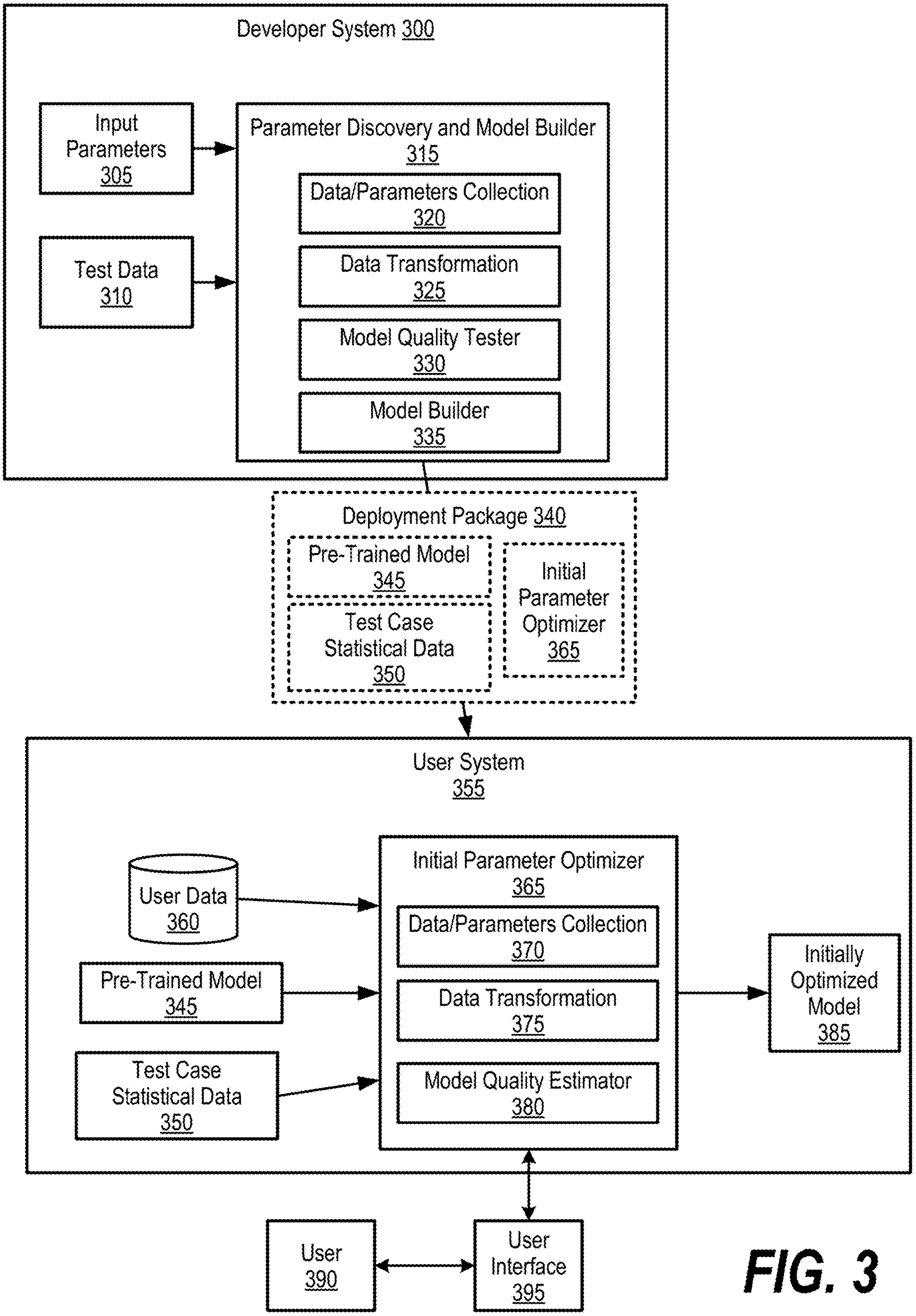
FIG. 3 is an exemplary diagram depicting a developer system deploying a pre-trained machine learning model to a user system that enables the user system to create a machine learning model whose parameters are initially optimized based on user data.

FIG. 3 is an exemplary diagram depicting a developer system deploying a pre-trained machine learning model to a user system that enables the user system to create a machine learning model whose parameters are initially optimized based on user data.

Developer system 300 first creates or reuses existing test cases to build a machine learning model (input parameters 305 and test data 310). Parameter discovery and model builder 315 then uses data/parameters collection 320 to collect input information from key parameters (input parameters 305) and characteristics of test data 310 such as size of input data, number of fields, number of categorical fields, number of continuous fields, etc. Test data 310 may be input data of test case or input data from test case. Test data 310 may also be training data used to train a model, test data used to evaluate a model, or validation data used to validate a model.

Data transformation 325 then computes univariate statistics of the categorical fields (e.g., number of categories, percentage of each categories, etc.) and computes univariate statistics of continuous fields (e.g., min, max, mean, standard deviation, variance, standard error, etc.) Data transformation 325 also computes bivariate statistics of target and predictors.

Then, because each test case may include a different number of statistics and/or different type of statistics, data transformation 325 transforms the univariate and bivariate statistics into a scaled format such that the statistics can be combined. In one embodiment, for each univariate and bivariate statistics, data transformation 325 uses feature scaling (e.g., min-max normalization) to bring all values into a range [0, 1] where n (e.g., n=5) is an equal width interval in the value range: [0, 1/n), [1/n, 2/n), [2/n, 3/n), . . . [(n−1)/n, 1]. Data transformation 325 then counts the number of statistics values in each range to generate a vector of n elements.

Then, model quality tester 330 runs all test case from test data 310 by combining the transformed test data with parameter sets from input parameters 305 and records accuracies (e.g., Classification Accuracy or MSE) of the output model of each test case. Then, model builder 335 builds a regression model (e.g., Linear Regression, Regression Tree) for the relationship between the model accuracy, the transformed test data, and the parameter sets. Developer system 340 then deploys pre-trained model 345, test case statistical data 350, and initial parameter optimizer 365 to user system 355 in deployment package 340.

User system 355 includes initial parameter optimizer 365, which performs various steps to produce initially optimized model 385 from pre-trained model 345. Data/parameters collection 370 collects information of characteristics of input data from user data 360. Then, data transformation 375 computes univariate and bivariate statistics from the collected information and transforms the univariate and bivariate statistics to a scaled format similar to that discussed above.

Model quality estimator 380 then calculates a similarity of input data between test case statistical data 350 and the transformed user data. Model quality estimator 380 displays the top N similar sets of test data information on user interface 395 to user 390. User 390 selects one of the top N similar sets of test data information and initial parameter optimizer 365 applies the user selected values of parameters for model building and predicts an accuracy of initially optimized model 385. User 390 then either accepts initially optimized model 385 for use, selects a different set of test data to create a different initially optimized model 385, or adjust parameters as needed.

In one embodiment, initial parameter optimizer 365 refreshes initially optimized model 385 after execution and collects information to refresh/add a new pre-trained machine learning model based on a) information of characteristics of input data; b) values of parameters; and c) accuracy of the machine learning model.

Figure 4:
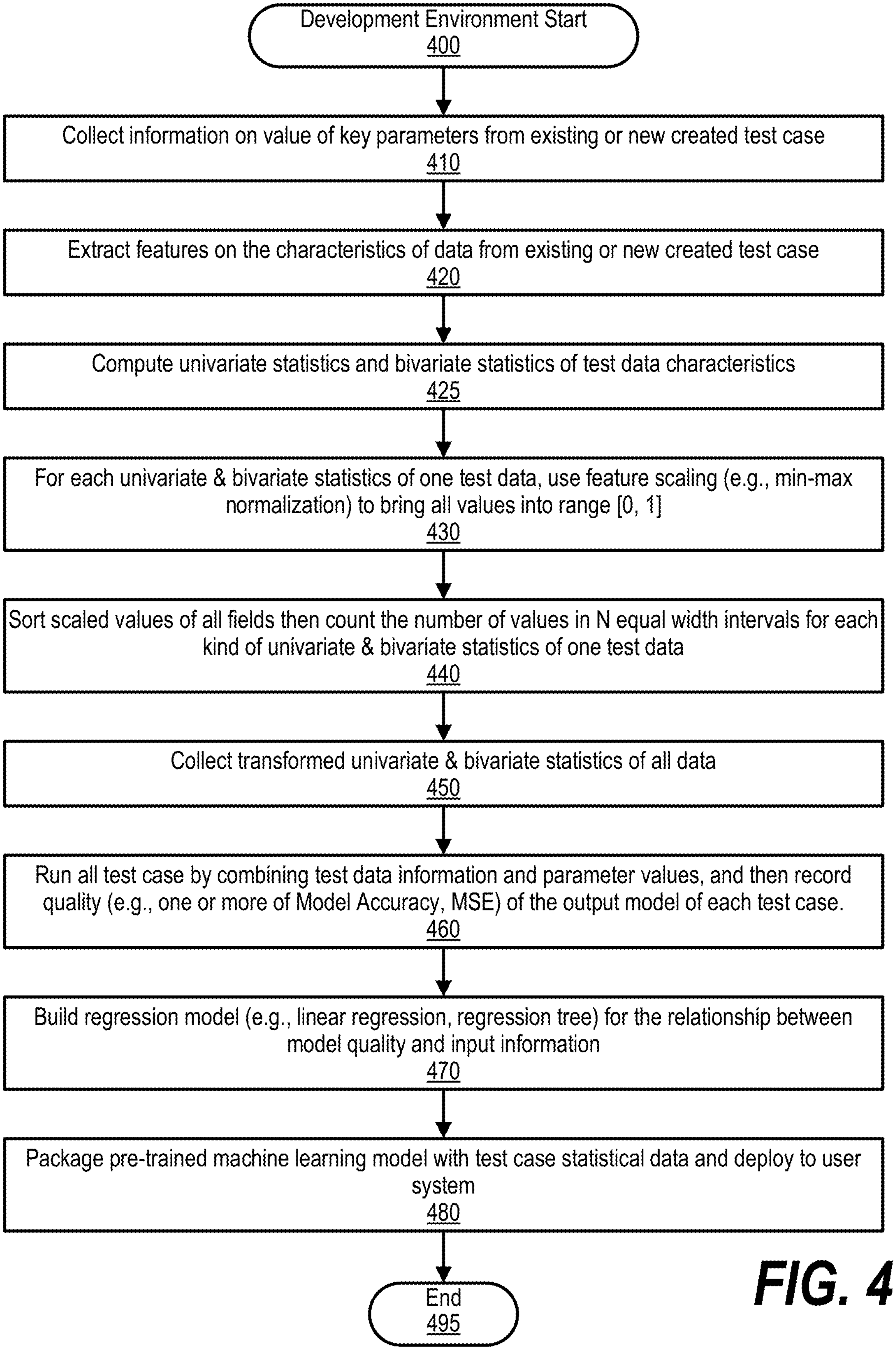
FIG. 4 is an exemplary flowchart showing steps taken in a development environment to build a pre-trained machine learning model.

FIG. 4 is an exemplary flowchart showing steps taken in a development environment to build a pre-trained machine learning model. FIG. 4 processing commences at 400 whereupon, at step 410, the process collects information on values of key parameters (input parameters 305) from existing or new created test cases (see FIG. 6, parameter information 600 and corresponding text for further details).

At step 420, the process extracts features on the characteristics of data from the existing or newly created test cases (test data 310). In one embodiment, the process extracts the size of input data, number of fields, number of categorical fields, number of continuous fields, etc. At step 425, the process computes univariate statistics and bivariate statistics of the test data. In one embodiment, the process computes univariate statistics of categorical fields (e.g., number of categories, percentage of each categories, etc.); computes univariate statistics of continuous fields (e.g., min, max, mean, standard deviation, variance, standard error); and computes bivariate statistics between target and predictors (see FIG. 6, test data information 650 and corresponding text for further details).

In one embodiment, the number of columns of test data are different (see FIG. 7, numerals 700, 720, and corresponding text for further details). As such, the process transforms the test data for each test case into a scaled format. Therefore, at step 430, for each univariate & bivariate statistics of one test data, the process uses feature scaling (e.g., min-max normalization) to bring all values into range [0, 1] (see FIG. 8, reference numerals 800, 840, and corresponding text for further details). In one embodiment, the process uses the following formula for feature scaling:

$$X_{scaled} = \frac{X - X_{min}}{X_{max} - X_{min}}$$

Figure 8:
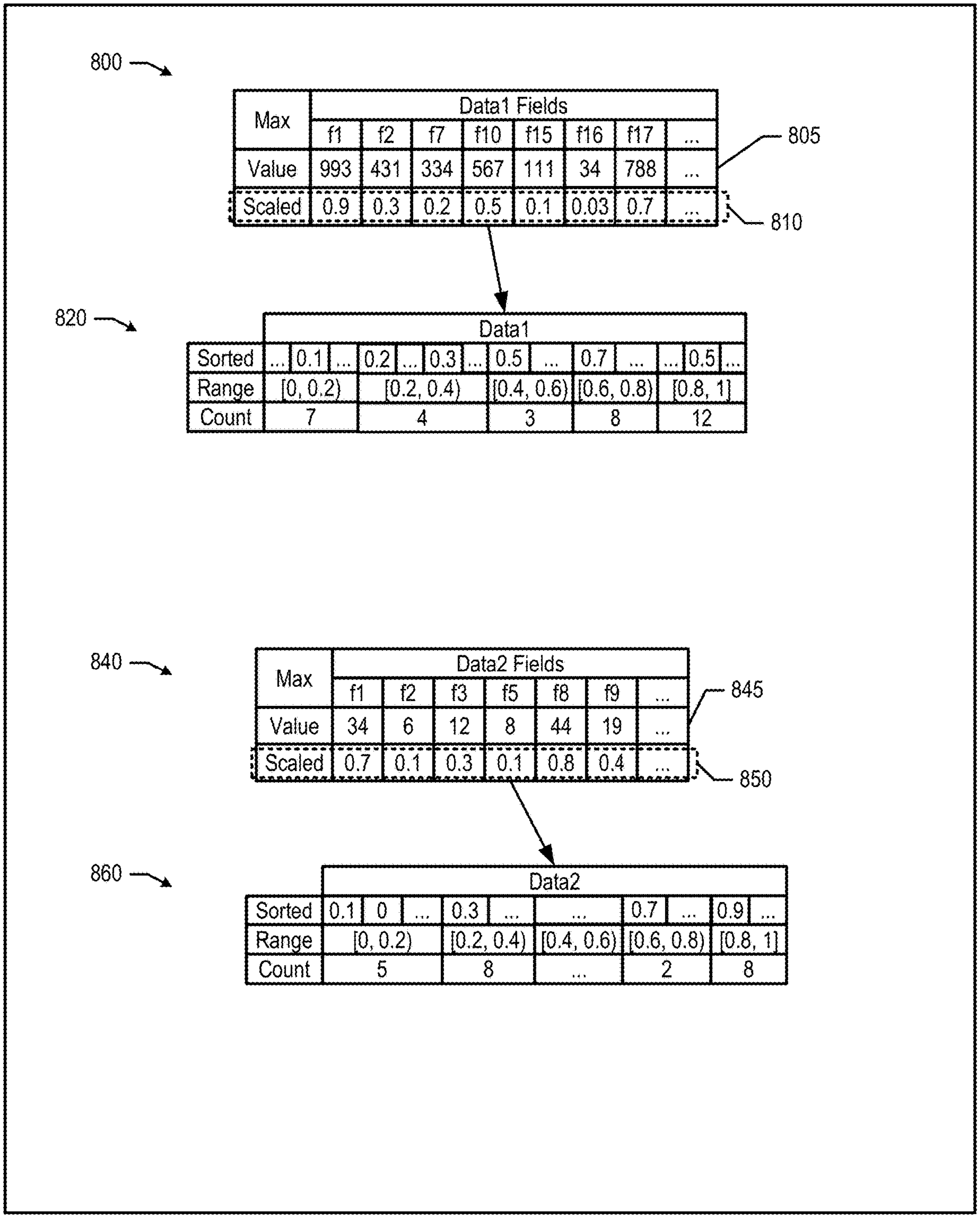
FIG. 8 is an exemplary diagram depicting various other tables utilized to build a machine learning model.

At step 440, the process sorts the scaled values of all fields and then counts the number of values in N equal width intervals for each kind of univariate & bivariate statistics of one test data. In one embodiment, N=max (n, sqrt (number of related fields)) where n is predefined value default=5, resulting in intervals: [0, 1/N), [1/N, 2/N), [2/N, 3/N), . . . [(N−1)/N, 1]. In this embodiment, as shown in FIG. 8, the intervals are [0, 0.2), [0.2, 0.4), [0.4, 0.6), [0.6, 0.8), [0.8, 1].

At step 450, the process collects the transformed (scaled and counted) univariate & bivariate statistics of the test data (see FIG. 9, table 900 and corresponding text for further details). At step 460, the process runs the test cases by combining the test data information with the parameter values and records the quality values (e.g., one or more of Model Accuracy, MSE) of the output model of each test case to create test case statistical data 350 (see FIG. 9 and corresponding text for further details).

At step 470, the process builds a regression model (e.g., linear regression, regression tree) for the relationship between model quality and input information. In one embodiment, the process builds the model Y=f(X) where:

Y: Quality of output (e.g., quality of output model)

X: Input info (characteristics of test data and values of key parameters)

f: The machine learning model

At step 480, the process packages pre-trained machine learning model 340 with test case statistical data 350 and deploys deployment package 340 to user system 355. FIG. 4 processing thereafter ends at 495.

Figure 5:
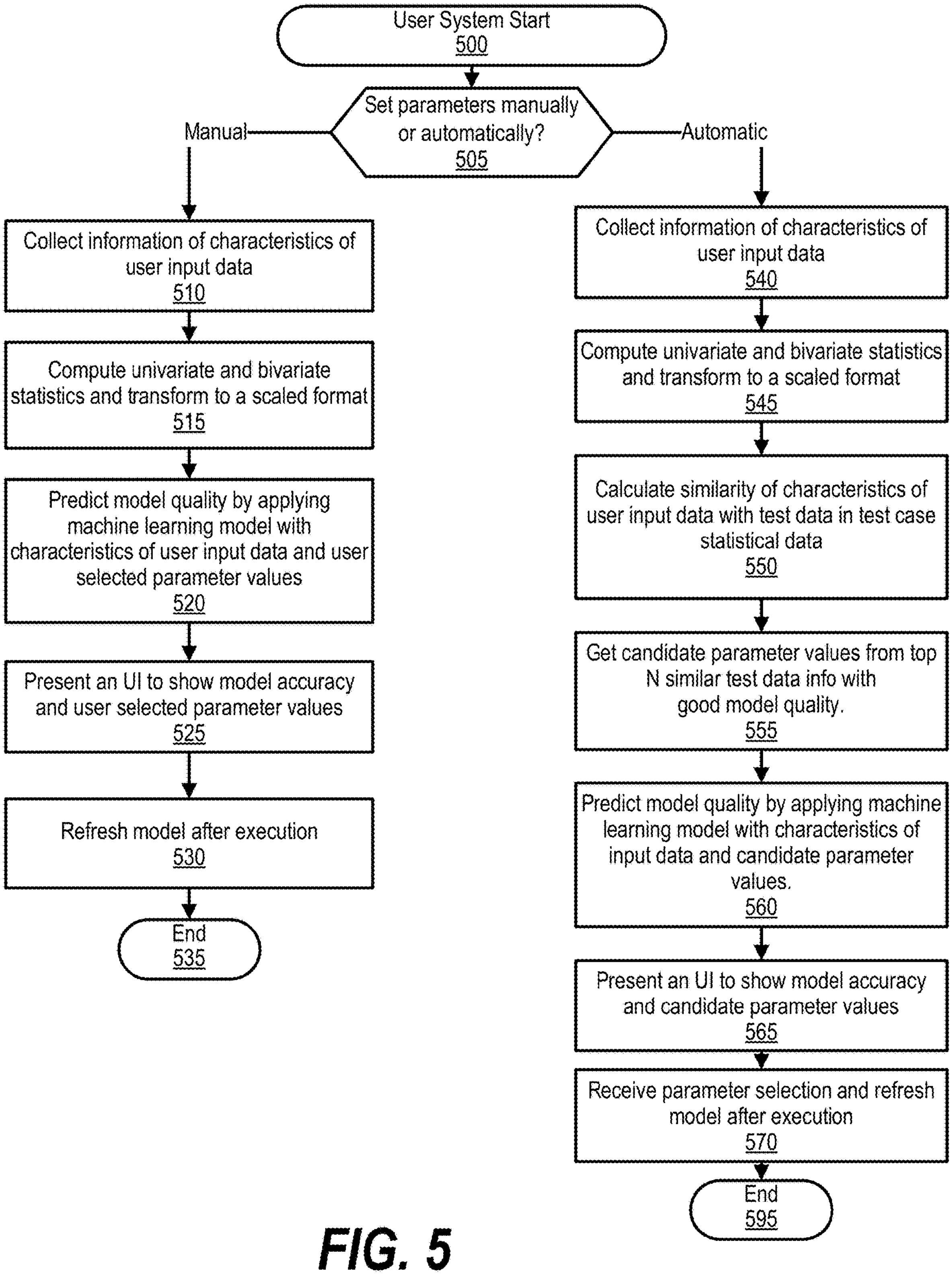
FIG. 5 is an exemplary flowchart showing steps taken to apply a machine learning model in a production environment.

FIG. 5 is an exemplary flowchart showing steps taken to apply a machine learning model in a production environment. FIG. 5 processing commences at 500, whereupon the process determines as to whether user 390 wishes to set parameters manually based on predicted model qualities or have initial parameter optimizer 365 automatically determine the parameters (decision 505). For example, user 390 may decide to set parameters manually if user 390 has enough knowledge and confidence to set the parameters correctly.

If the process should set parameters manually, then decision 505 branches to the ‘manual’ branch whereupon, at step 510, the process collects information of characteristics of user input data from user data 360. At step 515, the process computes univariate and bivariate statistics of the collected user data and transforms the statistics to a scaled format as discussed above.

At step 520, the process predicts model quality values by applying the machine learning model with characteristic of input data and user selected parameter values. At step 525, the process presents user 390 via user interface 395 the model accuracy and user selected parameter values (see FIG. 10, table 1000 and corresponding text for further details). At step 530, the process refreshes the machine learning model after execution. FIG. 5 processing thereafter ends at 535.

Referring back to decision 505, if the process should set parameters automatically, then decision 505 branches to the ‘automatic’ branch whereupon, at step 540, the process collects information of characteristics of user input data from user data 360, similar to step 510 above. At step 545, the process computes univariate and bivariate statistics of the collected user data and transforms the statistics to a scaled format as discussed above.

At step 550, the process calculates similarities of characteristics of input data between test data in the test case information, in one embodiment, by a known method such as with Euclidean distance computations:

$$\text{Distance}\,(id,\,td) = \sum_{i=1}^{n} \sqrt{(id_i - td_i)^2}$$

where:

Distance(id, td): Euclidean distance between id and td id: characteristics of input data td: characteristics of one test data in the test case information The process may also calculate data similarities using other methods such Pearson’s Correlation, Spearman’s correlation, etc. At step 555, the process identifies candidate parameter values from the top N similar test data information with good model quality (see FIG. 10, table 1020, and corresponding text for further details) and, at step 560, the process predicts model quality values by applying the machine learning model with characteristic of input data and candidate parameter values. At step 565, the process presents user 390 via user interface 395 with model accuracy values and candidate parameter values (see FIG. 10, table 1060 and corresponding text for further details). At step 570, the process receives parameter selections and refreshes the machine learning model after execution. FIG. 5 processing thereafter ends at 595.

FIG. 6 is an exemplary diagram depicting a parameter information table and test data information table utilized to build a machine learning model. Table 600 includes a list of parameters (input parameters 305) corresponding to test cases that are typically created by a software developer in the development phase. Each row corresponds to a different test case.

Test cases drive the execution of a product to cover some functions (machine learning model) and ensure the output/result of that function is expected/correct. For example, in a test case that includes input/test data, input parameters, execution result, and expected result, developer system 300 runs the test case and compares the execution result to the expected results to check the accuracy of the implemented function.

Developer system 300 typically uses several test cases to cover all the branches/sub feature of a tested function. To achieve this, developer system 300 usually creates many test cases with different test data (different values, different number of columns, and different type of values), and different values of parameters. As such, developer system 300 collects several sets of parameters from all these test cases shown in table 600. When a developer deigns a function, the developer knows the parameters that are important corresponding to the nature of the function.

Each row in table 650 represents test data information corresponding to a test case. Table 650 includes two types of information, which are i) overall test case information (file size, number of columns) about the data; and ii) descriptive statistics about each column in the data. Columns 660 include overall test case information that is directly observed from file information. Columns 670 include descriptive statistics that are calculated by univariate computations and bivariate computations of values of the data in test data 310.

FIG. 7 is an exemplary diagram depicting data in various other tables utilized to build a machine learning model. Table 700 and 720 include different sets of test data for two different test cases and show that the different test data has a different number of columns, different values, and different type of values based on the particular test case. As discussed earlier, developer system 300 transforms the different data types in a manner such that the data can be utilized to initially optimize machine learning model parameters.

Tables 740 and 770 include information (file info, descriptive statistics) of two sets of test data, such as in tables 700 and 720. Table 740’s columns 750 correspond to the first row (first test case file information) in table 650, and table 770's columns 780 correspond to the second row (second test case file information) in table 650.

Columns 760 and 790 correspond to descriptive statistics of tables 700 and 720, respectively. The number of columns for descriptive statistics in columns 760 and 790 are related to the number and type of columns in the original data. As such, columns 760 include three columns of mean values because table 700 includes three numeric columns, and columns 790 include seven columns of mean values because table 720 includes seven columns of mean values. Other types of statistics may be included in columns 760 and 790 such as min, max, variance, etc.

FIG. 8 is an exemplary diagram depicting various other tables utilized to build a machine learning model. As discussed above, the number of columns of test data may be different (tables 740 and 770) and, as such, developer system 300 transforms the test data for each test case into a uniform format (same number of columns and data type). FIG. 8 shows two stages of the transformation, which is the scaling step and then the sorting/counting step, details of which are discussed below.

Tables 800 and 840 correspond to tables 740 and 770. Table 800 includes the max values of table 740 and table 840 includes the max values of table 770. Developer system 300 uses feature scaling (e.g., min-max normalization) to bring all values into range [0, 1] and, in one embodiment, developer system 300 uses the following formula for feature scaling:

$$X_{scaled} = \frac{X - X_{min}}{X_{max} - X_{min}}$$

Rows 810 and 850 show the results of feature scaling of their respective data values in rows 805 and 845. Once the features values are scaled, developer system 300 sorts the scaled values of all fields and then counts the number of values in N equal width intervals for each kind of univariate & bivariate statistics of one test data. Table 820 shows that when N=5, the intervals are [0, 0.2), [0.2, 0.4), [0.4, 0.6), [0.6, 0.8), [0.8, 1], and the corresponding count values are 7, 4, 3, 8, 12.

The count value of intervals for final model building is utilized because the count value of intervals represents the characteristics of the information table and original data. For example, row 805 includes maximal values of numeric fields (column) of one input data. Developer system 300 also obtains maximal values of the numeric fields (column) from tables 650, 740, or 770. The count in each interval represents the distribution of the scaled data and developer system 350 uses this distribution as characteristic of the maximal values. The maximal value is one of several other characteristics (minimal value, mean, media, etc.) of the data and developer system 355 transforms the data for each descriptive statistic.

FIG. 9 is an exemplary diagram depicting various other tables utilized to build a machine learning model. Table 900 combines test case information 660 from table 650 with univariate and bivariate transformed descriptive statistics 920 (scale, sort, count). For example, the first row (data ID 1) includes test data information for a first test case and also includes univariate statistics and bivariate statistics after transformation of parameters corresponding to the test case.

Test case statistical data 350 appends input parameters 970 and output quality measurements 980 to table 900. Input parameters 970 correspond to table 600, and output quality measurements 980 corresponds to quality values of pre-trained model 345 based on a given test case with give parameters (in the same row).

FIG. 10 is an exemplary diagram depicting various tables utilized to create an initially optimized machine learning model in a production environment. Table 1000 corresponds to a first embodiment where user 390 manually sets parameters and user system 355 predicts model output quality based on user data 360. Table 1000 includes user-set parameters (set by user 390) and corresponding model quality information (MSE values) computed/predicted by pre-trained model 345 based on the user-set parameters. Pre-trained model 345 reflects the relationship between characteristic of input (input data, value of input parameters) and model quality.

When user 390 wishes to use pre-trained model 345 in user system 355, user 390 first selects an input data (user data 360), the sets values for the parameters. Before user system 355 commences execution, user system 355 collects information of user data 324 and transforms the user data for each statistic: scale, sort and count. As such, user system 355 computes values similar (same width) to the rows in table 900. User system 355 combines this row with the user specified parameter values and computes values similar (same width) to one row in test case statistical data 350 except there is no value for output quality column. User system 355 uses this row of values as input of the model to predict the output quality (this is the output of prediction of the machine learning model) and show user 390 selected parameters and the predicted output quality.

Table 1020 corresponds to a second embodiment where user 390 selects input data 360 but does not set values for parameters. Initial parameter optimizer 365 extracts information of input data from user data 360 and then finds similar data info from test case statistical data 350. Initial parameter optimizer 330 calculates a similarity of info/characteristic of user data 360 to each row, sorts the value by data similarity of all rows (data similarity values 1050), and then selects the top N rows. Data similarity values are computed using techniques such as Euclidean distance computations.

Once user 390 selects an input data and initial parameter optimizer 330 determines the top N similar rows from test case statistical data 350, initial parameter optimizer 330 shows table 1060 to user 390 via user interface 395. User 390 may select one of the rows (as value of parameters) to run the function (build the model). User 390 may also select one row (as value of parameters), adjust part or ail of value of parameters, and then run the function (build the model).

In one embodiment, user 390 may also select multiple rows as values of parameters and run the function (build several different models) in multiple times in parallel or in sequence. In this embodiment, initial parameter optimizer 330 shows user 390 the selected parameter values and output quality to provide options for selection.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A computer-implemented method comprising:

loading a machine learning model and a set of test case statistical data into a user system, wherein the set of test case statistical data is based on a set of test cases corresponding to the machine learning model and comprises a plurality of input parameter sets and a corresponding set of output quality measurements, and wherein the machine learning model is built by:

transforming univariate and bivariate statistics into a scaled format such that the statistics are combined through feature scaling, wherein transforming the univariate and bivariate statistics comprises:

sorting scaled statistic values and counting the values within predefined intervals to form fixed-length statistical distribution vectors, wherein the scaled statistic values are processed so that number of values falling within each predefined equal-width interval are determined in a manner that enables a uniform representation of data characteristics; and building the machine learning model based on the transformed univariate and bivariate statistics, and the plurality of input parameter sets;

comparing user data comprising a second transformed univariate and bivariate statistics on the user system against the set of test case statistical data, wherein the comparison identifies one of the plurality of input parameter sets to optimize the machine learning model based on the set of output quality measurements;

generating, at the user system, an optimized machine learning model using the machine learning model and the identified input parameter set;

displaying one or more similar sets of test data on a user interface;

responsive to receiving through the user interface a selection choice from the one or more similar sets of test data, applying the selection choice to the optimized machine learning model and predicting an accuracy of the optimized machine learning model;

outputting the optimized machine learning model to the user through the user interface; and responsive to receiving acceptance of the optimized machine learning model through the user interface executing the optimized machine learning model and refreshing the optimized machine learning model, by collecting information to add a new pre-trained machine learning model.

2. The computer-implemented method of claim 1 wherein, at a developer system, the method further comprises:

collecting a set of test data corresponding to the set of test cases;

transforming the set of test data into a set of transformed descriptive statistics, wherein the transforming comprises a set of analytic computations, a set of scaling computations, and a set of sorting computations;

running the set of test cases with the plurality of input parameter sets to generate the set of output quality measurements; and constructing the set of test case statistical data by combining the set of transformed descriptive statistics, the set of output quality measurements, and the plurality of input parameter sets.

3. The computer-implemented method of claim 2 further comprising:

packaging the test case statistical data, the machine learning model, and an initial parameter optimizer into a deployment package; and deploying the deployment package from the developer system to the user system.

4. The computer-implemented method of claim 3 wherein, at the user system, the method further comprises:

collecting, by the initial parameter optimizer, a set of user data characteristics of the user data;

transforming the set of user data characteristics into a set of transformed user data statistics;

receiving a set of user parameters from a user;

predicting a model quality of the optimized machine learning model based on the set of user parameters, the set of transformed user data statistics, and the set of output quality measurements; and displaying the predicted model quality of the optimized machine learning model to the user at the user system.

5. The computer-implemented method of claim 3 further comprising:

collecting, by the initial parameter optimizer, a set of user data characteristics of the user data;

transforming the set of user data characteristics into a set of transformed user data statistics;

calculating a set of data similarity values between the set of transformed user data statistics and the set of transformed descriptive statistics; and selecting a subset of the plurality of input parameter sets from the test case statistical data based on the set of data similarity values.

6. The computer-implemented method of claim 5 further comprising:

predicting a set of model quality values of the optimized machine learning model based on the subset of input parameter sets, the set of transformed user data statistics, and the set of output quality measurements;

displaying the set of model quality values and corresponding subset of input parameter sets to the user at the user system;

receiving a selection from the user that selects one of the subsets of input parameter sets; and creating the optimized machine learning model using the selected subset of input parameter sets.

7. The computer-implemented method of claim 6 further comprising:

receiving, from the user, a different selection that selects a different one of the subsets of input parameter sets, wherein the selection and the different selection are received concurrently; and creating a different optimized machine learning model using the different subset of input parameter sets, wherein the different optimized machine learning model is created concurrently with the optimized machine learning model.

8. An information handling system comprising:

one or more processors;

a memory coupled to at least one of the processors;

a set of computer program instructions stored in the memory and executed by at least one of the processors in order to perform actions of:

loading a machine learning model and a set of test case statistical data into a user system, wherein the set of test case statistical data is based on a set of test cases corresponding to the machine learning model and comprises a plurality of input parameter sets and a corresponding set of output quality measurements, and wherein the machine learning model is built by:

transforming univariate and bivariate statistics into a scaled format such that the statistics are combined through feature scaling, wherein transforming the univariate and bivariate statistics comprises:

sorting scaled statistic values and counting the values within predefined intervals to form fixed-length statistical distribution vectors, wherein the scaled statistic values are processed so that number of values falling within each predefined equal-width interval are determined in a manner that enables a uniform representation of data characteristics; and building the machine learning model based on the transformed univariate and bivariate statistics, and the plurality of input parameter sets;

comparing user data comprising a second transformed univariate and bivariate statistics on the user system against the set of test case statistical data, wherein the comparison identifies one of the plurality of input parameter sets to optimize the machine learning model based on the set of output quality measurements;

generating, at the user system, an optimized machine learning model using the machine learning model and the identified input parameter set;

displaying one or more similar sets of test data on a user interface;

responsive to receiving through the user interface a selection choice from the one or more similar sets of test data, applying the selection choice to the machine learning model and predicting an accuracy of the optimized machine learning model;

outputting the optimized machine learning model to the user through the user interface; and responsive to receiving acceptance of the optimized machine learning model through the user interface executing the optimized machine learning model and refreshing the optimized machine learning model, by collecting information to add a new pre-trained machine learning model.

9. The information handling system of claim 8 wherein the processors perform additional actions comprising:

collecting, at a developer system, a set of test data corresponding to the set of test cases;

transforming, at the developer system, the set of test data into a set of transformed descriptive statistics, wherein the transforming comprises a set of analytic computations, a set of scaling computations, and a set of sorting computations;

running, at the developer system, the set of test cases with the plurality of input parameter sets to generate the set of output quality measurements; and constructing, at the developer system, the set of test case statistical data by combining the set of transformed descriptive statistics, the set of output quality measurements, and the plurality of input parameter sets.

10. The information handling system of claim 9 wherein the processors perform additional actions comprising:

packaging the test case statistical data, the machine learning model, and an initial parameter optimizer into a deployment package; and deploying the deployment package from the developer system to the user system.

11. The information handling system of claim 10 wherein the processors perform additional actions comprising:

collecting, at the user system by the initial parameter optimizer, a set of user data characteristics of the user data;

transforming the set of user data characteristics into a set of transformed user data statistics;

receiving a set of user parameters from a user;

predicting a model quality of the optimized machine learning model based on the set of user parameters, the set of transformed user data statistics, and the set of output quality measurements; and displaying the predicted model quality of the optimized machine learning model to the user at the user system.

12. The information handling system of claim 10 wherein the processors perform additional actions comprising:

collecting, by the initial parameter optimizer, a set of user data characteristics of the user data;

transforming the set of user data characteristics into a set of transformed user data statistics;

calculating a set of data similarity values between the set of transformed user data statistics and the set of transformed descriptive statistics; and selecting a subset of the plurality of input parameter sets from the test case statistical data based on the set of data similarity values.

13. The information handling system of claim 12 wherein the processors perform additional actions comprising:

predicting a set of model quality values of the optimized machine learning model based on the subset of input parameter sets, the set of transformed user data statistics, and the set of output quality measurements;

displaying the set of model quality values and corresponding subset of input parameter sets to the user at the user system;

receiving a selection from the user that selects one of the subsets of input parameter sets; and creating the optimized machine learning model using the selected subset of input parameter sets.

14. The information handling system of claim 13 wherein the processors perform additional actions comprising:

receiving, from the user, a different selection that selects a different one of the subsets of input parameter sets, wherein the selection and the different selection are received concurrently; and creating a different optimized machine learning model using the different subset of input parameter sets, wherein the different optimized machine learning model is created concurrently with the optimized machine learning model.

15. A computer program product stored in a computer readable storage medium, comprising computer program code that, when executed by an information handling system, causes the information handling system to perform actions comprising:

loading a machine learning model and a set of test case statistical data into a user system, wherein the set of test case statistical data is based on a set of test cases corresponding to the machine learning model and comprises a plurality of input parameter sets and a corresponding set of output quality measurements, and wherein the machine learning model is built by:

transforming univariate and bivariate statistics into a scaled format such that the statistics are combined through feature scaling, wherein transforming the univariate and bivariate statistics comprises:

sorting scaled statistic values and counting the values within predefined intervals to form fixed-length statistical distribution vectors, wherein the scaled statistic values are processed so that number of values falling within each predefined equal-width interval are determined in a manner that enables a uniform representation of data characteristics; and building the machine learning model based on the transformed univariate and bivariate statistics, and the plurality of input parameter sets;

comparing user data comprising a second transformed univariate and bivariate statistics on the user system against the set of test case statistical data, wherein the comparison identifies one of the plurality of input parameter sets to optimize the machine learning model based on the set of output quality measurements;

generating, at the user system, an optimized machine learning model using the machine learning model and the identified input parameter set;

displaying one or more similar sets of test data on a user interface;

responsive to receiving through the user interface a selection choice from the one or more similar sets of test data, applying the selection choice to the machine learning model and predicting an accuracy of the optimized machine learning model;

outputting the optimized machine learning model to the user through the user interface; and responsive to receiving acceptance of the optimized machine learning model through the user interface executing the optimized machine learning model and refreshing the optimized machine learning model, by collecting information to add a new pre-trained machine learning model.

16. The computer program product of claim 15 wherein, at a developer system, the information handling system performs further actions comprising:

collecting a set of test data corresponding to the set of test cases;

transforming the set of test data into a set of transformed descriptive statistics, wherein the transforming comprises a set of analytic computations, a set of scaling computations, and a set of sorting computations;

running the set of test cases with the plurality of input parameter sets to generate the set of output quality measurements; and constructing the set of test case statistical data by combining the set of transformed descriptive statistics, the set of output quality measurements, and the plurality of input parameter sets.

17. The computer program product of claim 16 wherein the information handling system performs further actions comprising:

packaging the test case statistical data, the machine learning model, and an initial parameter optimizer into a deployment package; and deploying the deployment package from the developer system to the user system.

18. The computer program product of claim 17 wherein, at the user system, the information handling system performs further actions comprising:

collecting, by the initial parameter optimizer, a set of user data characteristics of the user data;

transforming the set of user data characteristics into a set of transformed user data statistics;

receiving a set of user parameters from a user;

predicting a model quality of the optimized machine learning model based on the set of user parameters, the set of transformed user data statistics, and the set of output quality measurements; and displaying the predicted model quality of the optimized machine learning model to the user at the user system.

19. The computer program product of claim 17 wherein the information handling system performs further actions comprising:

collecting, by the initial parameter optimizer, a set of user data characteristics of the user data;

transforming the set of user data characteristics into a set of transformed user data statistics;

calculating a set of data similarity values between the set of transformed user data statistics and the set of transformed descriptive statistics; and selecting a subset of the plurality of input parameter sets from the test case statistical data based on the set of data similarity values.

20. The computer program product of claim 19 wherein the information handling system performs further actions comprising:

predicting a set of model quality values of the optimized machine learning model based on the subset of input parameter sets, the set of transformed user data statistics, and the set of output quality measurements;

displaying the set of model quality values and corresponding subset of input parameter sets to the user at the user system;

receiving a selection from the user that selects one of the subsets of input parameter sets; and creating the optimized machine learning model using the selected subset of input parameter sets.

* * * * *